US006962737B2

(12) United States Patent
Volfson

(10) Patent No.: US 6,962,737 B2
(45) Date of Patent: Nov. 8, 2005

(54) SIMULATED STAINED GLASS MODULAR ELECTROLUMINESCENT ARTICLES

(76) Inventor: Boris Volfson, 5707 W. Maple Grove Rd., Apt. 3046, Huntington, IN (US) 46750

(*) Notice: Subject to any disclaimer, the term of this patent is extended or adjusted under 35 U.S.C. 154(b) by 54 days.

(21) Appl. No.: 10/724,968

(22) Filed: Dec. 1, 2003

(65) Prior Publication Data

US 2005/0118377 A1 Jun. 2, 2005

(51) Int. Cl.[7] .................................................. B32B 3/10
(52) U.S. Cl. ........................................ 428/38; 52/311.2
(58) Field of Search .......................... 428/38; 52/311.2

(56) References Cited

U.S. PATENT DOCUMENTS 286,434 A 10/1883 Herzog
3,876,483 A 4/1975 Holt
3,900,641 A 8/1975 Woodman

*Primary Examiner*—Alexander S. Thomas

(57) ABSTRACT

A simulated stained glass modular electroluminescent article is comprised of electroluminescent modules. Each module is comprised of electroluminophores arranged in a predetermined decorative pattern, a pair of electroconductive walls trapping these electroluminophores, and a plurality of lead-simulating strips coinciding with the boundaries of the electroluminophores. Under the application of electrical current, the flat panels or tree-dimensional articles constructed from the electroluminescent modules, emit light which is visually consistent with sunlight passing through a stained glass.

6 Claims, 3 Drawing Sheets

SIMULATED STAINED GLASS MODULAR ELECTROLUMINESCENT ARTICLES

TECHNICAL FIELD

The technical field of this disclosure represents electroluminescent articles, specifically simulated stained glass modular electroluminescent articles.

BACKGROUND OF THE INVENTION

Electroluminescence is commonly known as panel lighting. In light panels, particles of scintillation material, or electroluminophore, are suspended in a thin layer of non-conductive material such as plastic. This layer is sandwiched between two plate conductors one of which represents a translucent substance, such as glass or plastic, coated on the inside with a thin film of oxide of metal. With the two conductors acting as electrodes, a current is passed through the electroluminophore, causing it to luminesce. Luminescent panels may serve a variety of purposes, for example, to illuminate clock and radio dials, to outline the risers in staircases, and to provide luminous walls. Until recently, the use of panel lighting was restricted because the current requirements for large installations were excessive and because the life of the phosphor and the conductor coating was limited. However, recent advancements in the material science have resulted in the development of electroluminophores that emit bright light in different wavelengths for thousands of hours.

The art of stained glass is known for nearly one thousand years. It is based on the effect of light passing through a colored glass thus creating a beautiful glowing image. The colored pieces of glass are interconnected, usually by lead or copper. The main drawback of stained glass is the high cost of production caused by the need for a highly skilled labor and a substantial time required to produce the stained glass objects. Another drawback of stained glass is based on the fact that, in order to obtain the full visual effect, a stained glass object must be installed in a window. But even then, at night, when there is no light, there is no image.

In the U.S. Pat. No. 286,434, Herzog disclosed imitation stained glass with the imitation leads applied to the surface of glass. This glass is coated between the imitation lead strips with varnish, lacquer, or a similar colored substance, transparent or translucent.

In the U.S. Pat. No. 3,900,641, Woodman et al disclosed simulated stained glass panels printed with transparent colors in a desired pattern with simulated lead strips separating the colored areas.

The above two patents have addressed the high cost and the complexity of manufacturing of stained glass, but the simulated stained glass object would not glow unless it is installed in a window where the image can only be seen during the daytime.

In the late 19th–early 20th Century, Luis Comfort Tiffany created some of the most beautiful stained glass works ever made. However, he was concerned with the limitations of stained glass. This is why Tiffany decided to utilize the newly invented incandescent light in creating a new “Tiffany lamp” where the art of stained glass could be enjoyed day and night. However, this is a costly technology that requires the use of a light bulb and wrapping the artwork around it, thus limiting the size and shape of the stained glass object.

In the U.S. Pat. No. 3,876,483, Holt disclosed a method of making simulated stained glass articles such as Tiffany-style lamp shades where a pre-patterned color film is sandwiched between pre-forms made of a translucent material. However, this method has all the drawbacks of the Tiffany method except for the high manufacturing cost.

BACKGROUND OF INVENTION: OBJECTS AND ADVANTAGES

One object of this invention is providing simulated stained glass articles that actively emit light rather then passively transmitting it. Another object of this invention is providing inexpensive and attractive simulated stained glass articles that could be manufactured in the factory environment with a mass production process that doesn’t require a highly skilled labor.

The advantages of this invention are in its important practical applications that include light-emitting windows, decorated mirrors, jewelry boxes, decorative plates, lighted clocks, glass sculptures, tables, chests, lighted vases, light-emitting partitions, door and window inserts, lighting fixtures, Tiffany style floor and desk lamps, night-lights, wall pictures, and decorative lighting panels—both exterior and interior.

SUMMARY OF THE INVENTION

In a simulated stained glass modular electroluminescent article, simulated stained glass electroluminescent modules are arranged into a flat decorative-panel or a three-dimensional decorative object.

In the simulated stained glass electroluminescent module, electrically-stimulated scintillation materials, or electroluminophores, are arranged in a decorative pattern and sandwiched between a pair of electroconductive walls. According to the preferred embodiment, both electroconductive walls are translucent and light is emitted from the module toward both sides. In another embodiment, one of the electroconductive walls is translucent and another is reflective, and light, amplified by the reflection, is emitted from the module toward one side.

Lead-simulating lines are disposed on the outside of the electroconductive walls to substantially coincide with the boundaries of the electroluminophores. Under the application of electric current, the electroluminophores emit light with the simulated stained glass modular electroluminescent article creating a visual effect which is consistent with that of sunlight passing through a stained glass.

DRAWINGS REFERENCE NUMERALS

Figures 1, 2A, 2B:
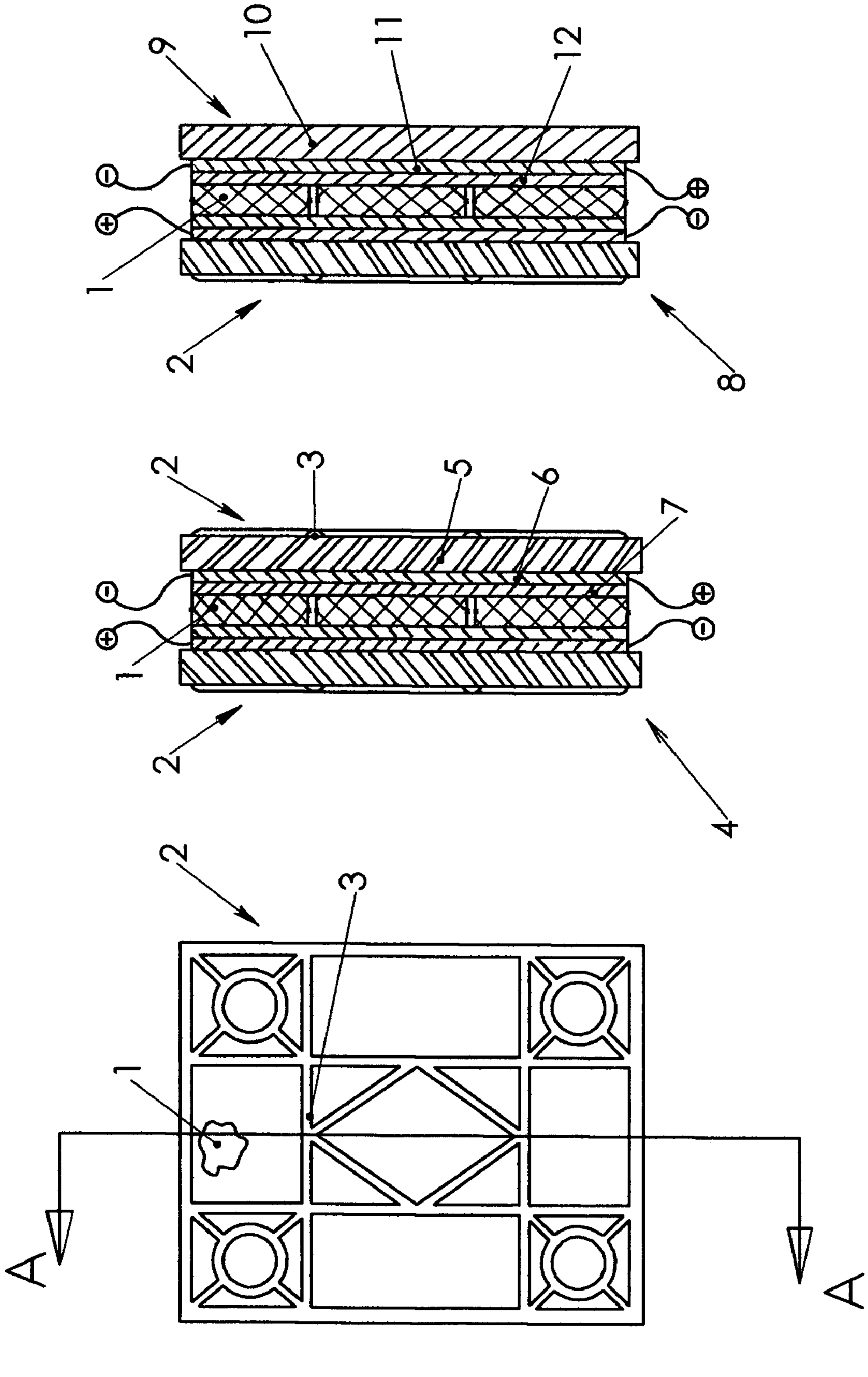
FIG. 1 is a front view of a simulated stained glass electroluminescent module constructed in accordance with current invention.
FIGS. 2A & 2B are sectional views of simulated stained glass electroluminescent modules constructed in accordance with current invention.

1. electroluminophores
2. optically translucent electroconductive wall
3. lead-simulating strips 4. simulated stained glass electroluminescent module of the preferred embodiment
5. translucent substrate
6. translucent electrode layer
7. translucent dielectric layer
8. simulated stained glass electroluminescent module of another embodiment
9. optically reflective electroconductive wall
10. substrate
11. reflective electrode layer
12. translucent insulation layer

DETAILED DESCRIPTION

FIG. 1 is a front view of a simulated stained glass electroluminescent module.

A plurality of electroluminophores 1 is shown through a cut-out in an optically translucent electroconductive wall 2. The electroluminophores 1 are arranged into a decorative pattern consistent with that of a stained glass. The electroluminophores may be constructed of an organic or synthetic powder or thin film, and produce light under the application of alternating or direct current field.

A plurality of lead-simulating strips 3 is disposed on the outside surface of the optically translucent electroconductive wall 2. The lead-simulating strips 3 are disposed to coincide with the boundaries of the electroluminophores 1. The lead-simulating strips may be executed in metal or plastic.

FIG. 2A is a sectional view along the cross-section line A—A of the preferred embodiment of the simulated stained glass electroluminescent module.

In a simulated stained glass electroluminescent module of the preferred embodiment 4, the electroluminophores 1 are sandwiched in a pair of electroconductive walls where both electroconductive walls are optically translucent. Each of the optically translucent electroconductive walls 2 is comprised of a translucent substrate 5, a translucent electrode layer 6 disposed on the translucent substrate 5, and a translucent dielectric layer 7 disposed on the translucent electrode layer 6.

The translucent substrate is preferably a glass or plastic panel. The translucent electrode layer is constructed of tin oxide, indium oxide, or the like conductor. The translucent dielectric layer is executed as a thin film of epoxy resin, or the like insulator.

The lead-simulating strips 3 are disposed on the outside surface of the translucent substrate 5 to coincide with the boundaries of the electroluminophores 1.

Under the application of electrical current to the translucent electrode layers 6, the resulting electromagnetic field stimulates the electroluminophores 1 to emit light through the optically translucent electroconductive walls 2 from both sides of the simulated stained glass electroluminescent module of the preferred embodiment 4, this light is visually consistent with that of the stained glass affected by sunlight.

It is known to those skilled in the art that, with the certain luminophore compositions, the use of the translucent dielectric layer is not required. The simulated stained glass electroluminescent modules, not employing translucent dielectric layers, fall within the scope of this invention.

FIG. 2B is a sectional view along the cross-section line A—A showing another embodiment of the simulated stained glass electroluminescent module.

In a simulated stained glass electroluminescent module of another embodiment 8, the electroluminophores 1 are sandwiched in a pair of electroconductive walls where one electroconductive wall is optically translucent, and another wall is optically reflective.

An optically reflective electroconductive wall 9 comprises a substrate 10, a reflective electrode layer 11 disposed on the substrate 10, and a translucent insulation layer 12 disposed on the reflective electrode layer 11.

The substrate is a plastic or glass panel. The reflective electrode layer is made of thin aluminum film, silver film, or the like conductor. The translucent insulation layer is executed as a thin film of epoxy resin, or the like dielectric.

Under the application of electrical current to the translucent electrode layer 6 and the reflective electrode layer 11, the resulting electromagnetic field stimulates the electroluminophores 1 to emit light. Amplified by the optically reflective electroconductive wall 9, the light is emitted through the optically translucent electroconductive wall 2 from one side of the simulated stained glass electroluminescent module of another embodiment 8, this light being visually consistent with that of the stained glass affected by sunlight.

With some luminophore compositions, the use of the translucent insulation layer is not required. Also, there electroluminescence devices are well-known where the substrate is not used. The simulated stained glass electroluminescent modules, not employing the substrate and/or the translucent insulation layer, fall within the scope of this invention.

Figure 3A:
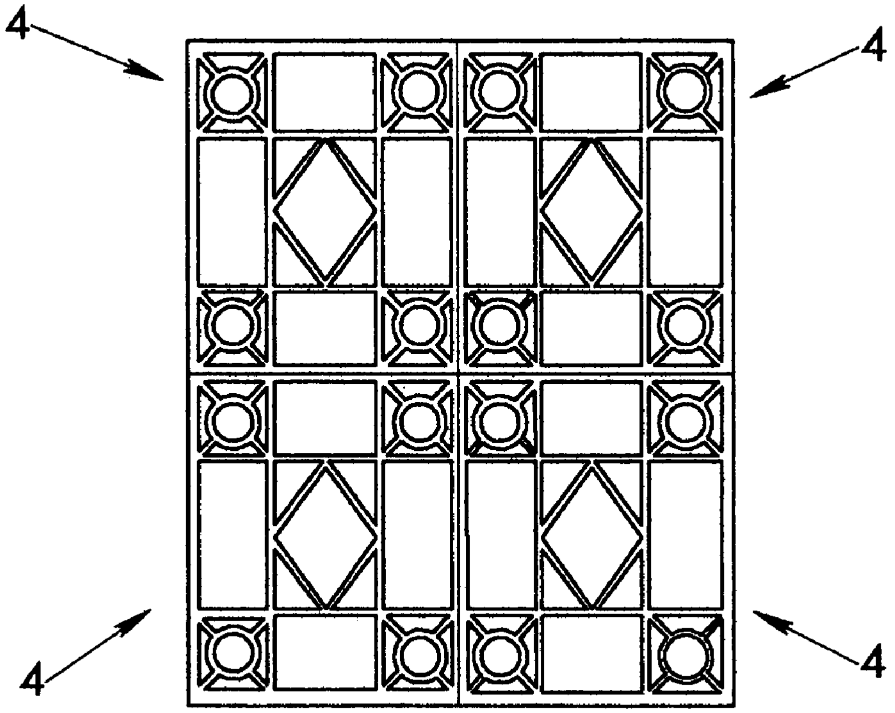
FIGS. 3A & 3B are front views of the simulated stained glass modular electroluminescent articles constructed in accordance with current invention as a flat decorative panel.

FIG. 3A is a front view of a simulated stained glass modular electroluminescent article constructed as a flat decorative panel from the simulated stained glass electroluminescent modules of the preferred embodiment 4. The flat decorative panels of this type may be utilized for such application as a room partition.

Figure 3B:
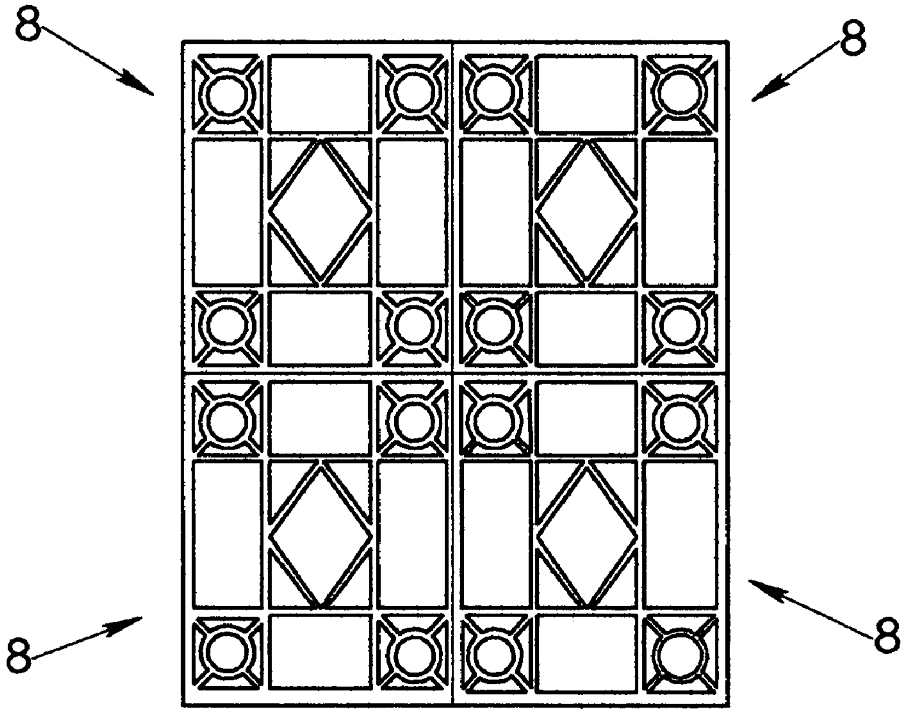

FIG. 3B is a front view of the simulated stained glass modular electroluminescent article also constructed as a flat decorative panel but this time from the simulated stained glass electroluminescent modules of another embodiment 8. The flat decorative panels of this type may be utilized for such application as a wall picture.

Figure 4:
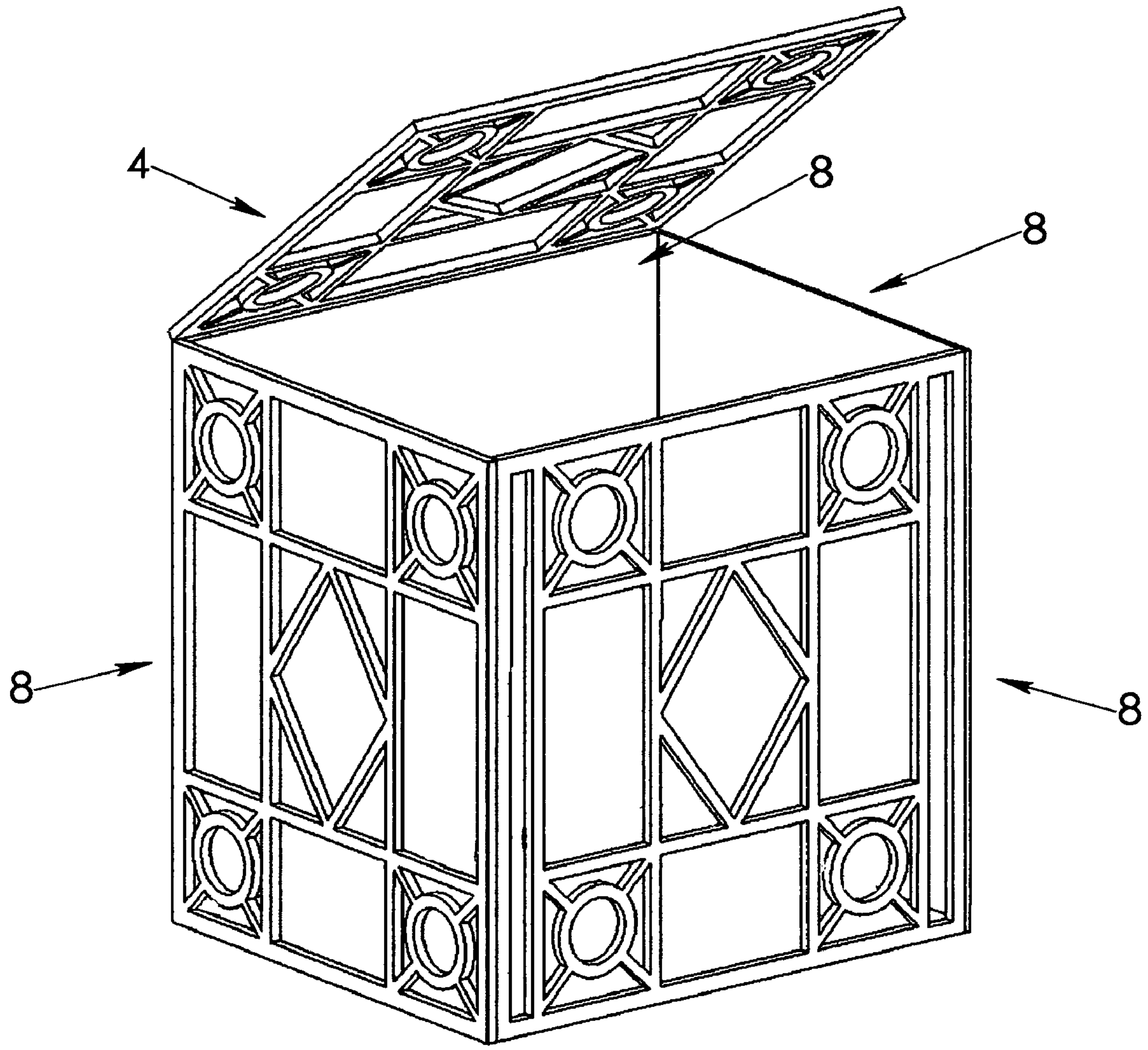
FIG. 4 is a perspective view of the simulated stained glass modular electroluminescent article constructed in accordance with current invention as a three-dimensional decorative object.

FIG. 4 is a perspective view of the simulated stained glass modular electroluminescent article constructed as a three-dimensional decorative object.

In such application as a lighted chest, the simulated stained glass electroluminescent modules of the preferred embodiment 4 could be used for the lid, and the simulated stained glass electroluminescent modules of another embodiment 8 may be utilized for the front, back, and side walls.

What is claimed is:

1. A simulated stained glass electroluminescent module comprising:

a pair of electroconductive walls;

a plurality of electroluminophores arranged in a decorative pattern, said electroluminophores sandwiched between the electroconductive walls; and a plurality of lead-simulating strips disposed on the outside surfaces of said electroconductive walls, the lead-simulating strips substantially coinciding with the boundaries of said electroluminophores.

2. The module of claim 1 wherein each electroluminophore is formulated to reflect light of substantially the same color as the color of the electrically-induced scintillation of said electroluminophore, whereby the color scheme of said simulated stained glass electroluminescent module remains consistent whether or not it is electrically stimulated.

3. The module of claim 1, wherein the pair of electroconductive walls comprise two optically translucent electroconductive walls.

4. The module of claim 1, wherein the pair of electroconductive walls comprise one optically translucent electroconductive wall and one optically reflective electroconductive wall.

5. The module of claim 3, wherein the optically translucent electroconductive walls comprise a translucent substrate, a translucent electrode layer disposed on said translucent substrate, and a translucent dielectric layer disposed on said translucent electrode layer, whereby under the application of an electromagnetic field said electroluminophores emit light from both sides of said module.

6. The module of claim 4, wherein the optically reflective electroconductive wall comprises a substrate, a reflective electrode layer disposed on said substrate, and a translucent insulation layer disposed on said reflective electrode layer, whereby under the application of an electromagnetic field said electroluminophores emit light amplified by said reflective electroconductive wall from one side of said module.

* * * * *